United States Patent
Rodriguez et al.

(10) Patent No.: US 9,091,171 B2
(45) Date of Patent: Jul. 28, 2015

(54) TEMPERATURE CONTROL WITHIN A CAVITY OF A TURBINE ENGINE

(71) Applicants: Jose L. Rodriguez, Lake Mary, FL (US); David A. Little, Chuluota, FL (US); Jiping Zhang, Winter Springs, FL (US); Abdullatif M. Chehab, Chuluota, FL (US)

(72) Inventors: Jose L. Rodriguez, Lake Mary, FL (US); David A. Little, Chuluota, FL (US); Jiping Zhang, Winter Springs, FL (US); Abdullatif M. Chehab, Chuluota, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 471 days.

(21) Appl. No.: 13/663,737

(22) Filed: Oct. 30, 2012

(65) Prior Publication Data

US 2014/0119880 A1     May 1, 2014

(51) Int. Cl.
| F01D 17/00 | (2006.01) |
| F01D 25/00 | (2006.01) |
| F01D 9/06 | (2006.01) |
| F01D 25/16 | (2006.01) |
| F02C 7/18 | (2006.01) |

(52) U.S. Cl.
CPC .............. *F01D 9/065* (2013.01); *F01D 25/162* (2013.01); *F02C 7/18* (2013.01); *F05D 2260/601* (2013.01)

(58) Field of Classification Search
CPC ......... F01D 9/065; F01D 25/162; F02C 7/18; F05D 2260/601
See application file for complete search history.

(56) References Cited

U.S. PATENT DOCUMENTS

| 3,631,672 | A | * | 1/1972 | Gentile et al. ................ 415/116 |
| 4,765,373 | A | | 8/1988 | Munroe |
| 6,035,929 | A | | 3/2000 | Friedel et al. |
| 6,379,108 | B1 | | 4/2002 | Schmidt |
| 6,478,534 | B2 | | 11/2002 | Bangert et al. |
| 7,124,590 | B2 | * | 10/2006 | Hoff et al. ...................... 415/176 |
| 7,273,345 | B2 | | 9/2007 | Birrell et al. |
| 7,329,084 | B2 | | 2/2008 | Dittmann et al. |
| 7,766,610 | B2 | | 8/2010 | Busekros et al. |
| 7,798,767 | B2 | | 9/2010 | Kondo et al. |
| 8,726,672 | B2 | * | 5/2014 | Ciofini et al. ................... 60/782 |
| 8,893,509 | B2 | * | 11/2014 | Tanimura ........................ 60/785 |

FOREIGN PATENT DOCUMENTS

| CH | 512664 A | 9/1971 |
| EP | 1520960 A2 | 4/2005 |
| EP | 2336524 A2 | 6/2011 |

* cited by examiner

*Primary Examiner* — Igor Kershteyn (57) ABSTRACT

A turbine engine including an intermediate space defined between outer and inner portions of the turbine engine. A flow energizer is provided including a flow body located within the intermediate space and including an inlet port, an outlet port and a flow passage extending within the flow body between the inlet and outlet ports. The inlet port receives a flow of a first medium located within the intermediate space and the flow body injects an energizing flow of a second medium to a portion of the first medium within the flow body to create an energized flow of a mixed medium from the outlet portion, the energized flow of mixed medium creates a flow of the first medium adjacent to the flow body within the intermediate space.

19 Claims, 7 Drawing Sheets

TEMPERATURE CONTROL WITHIN A CAVITY OF A TURBINE ENGINE

FIELD OF THE INVENTION

The present invention relates to gas turbine engines and, more particularly, to equalizing a temperature distribution within an outer case of a gas turbine engine.

BACKGROUND OF THE INVENTION

A gas turbine engine generally includes a compressor section, a combustor section, a turbine section and an exhaust section. In operation, the compressor section may induct ambient air and compress it. The compressed air from the compressor section enters one or more combustors in the combustor section. The compressed air is mixed with the fuel in the combustors, and the air-fuel mixture can be burned in the combustors to form a hot working gas. The hot working gas is routed to the turbine section where it is expanded through alternating rows of stationary airfoils and rotating airfoils and used to generate power that can drive a rotor. The expanded gas exiting the turbine section may then be exhausted from the engine via the exhaust section.

Advancements in gas turbine engine technology have resulted in increasing temperatures, and associated outer case deformation due to thermal expansion. Case deformation may increase stresses in the case and in components supported on the case within the engine, such as bearing support struts for supporting an exhaust end bearing. The additional stress, which may operate in combination with low cycle fatigue, may contribute to cracks, fractures or failures of the bearing support struts.

SUMMARY OF THE INVENTION

In accordance with an aspect of the invention, a turbine engine is provided including an intermediate space defined between outer and inner portions of the turbine engine. A flow energizer is provided including a flow body located within the intermediate space and including an inlet port, an outlet port and a flow passage extending within the flow body between the inlet and outlet ports. The inlet port receives a flow of a first medium located within the intermediate space and the flow body injects an energizing flow of a second medium to a portion of the first medium within the flow body to create an energized flow of a mixed medium from the outlet portion, the energized flow of mixed medium creates a flow of the first medium adjacent to the flow body within the intermediate space.

The intermediate space may comprise an annular outer cavity generally centered around a longitudinal axis of the engine between the outer and inner portions.

The outer portion may comprise an exhaust casing and the engine may include a plurality of struts extending tangentially or radially through the outer cavity from the exhaust casing to a rear bearing for the engine. A plurality of the flow energizers may be provided for ejecting a plurality of energized flows in an axial direction between the struts.

An annular exhaust gas flow path may be provided extending through the exhaust casing, the flow path being defined between an inner flow path wall and an outer flow path wall, and the outer flow path wall comprising the inner portion. The struts may extend through strut shields extending between the inner and outer flow path walls wherein the strut shields form a flow path between the outer cavity and a bearing cavity radially inward from the inner flow path wall.

A barrier structure may be located between the struts and respective ones of the strut shields, adjacent to the inner flow path wall, limiting passage of air from within the bearing cavity radially outward to the outer cavity.

The flow energizers may include an elongated diffuser extending in an upstream direction relative to a gas flow through the flow path, and the diffusers may be oriented to provide a direction of the plurality of energized flows having a component in the circumferential direction to induce a circumferential flow of the first medium around the outer cavity.

The flow energizer may be a flow amplifier and the energizing flow of the second medium may comprise a flow of compressed air provided to the flow passage, wherein a volume flow of the mixed medium from the flow passage is substantially greater than a volume flow of the compressed air into the flow passage.

In accordance with another aspect of the invention, a gas turbine engine is provided including an outer casing, an annular exhaust gas flow path defined between outer and inner flow path walls, and an outer cavity located radially outward from the flow path. The engine further comprises a plurality of structural struts supporting a rear bearing of the engine to the outer casing, and a strut shield surrounding each of the struts in an area extending between the outer and inner flow path walls. A plurality of flow amplifiers are circumferentially distributed within the outer cavity for effecting a circulating flow in a circumferential direction, each of the flow amplifiers having a flow body located within the outer cavity and defining an inlet port for receiving a first medium within a flow passage of the flow body, and an outlet port for providing an energized flow ejecting the first medium entering the inlet port.

Each flow body may include a supply port for receiving a second medium from a source external to the outer cavity, the second medium being injected into the flow passage of the flow body, between the inlet and outlet ports, to energize a flow of the first medium through the flow body.

The supply port may be connected to a conduit extending through the outer wall to the flow body for supplying the second medium.

The outer casing may comprise a turbine exhaust casing and an aft support structure supported at a rear flange of the turbine exhaust casing, the aft support structure including a plurality of detachable cover plates located circumferentially around the aft support structure to define an aft chamber of the outer cavity between the cover plates and the outer flow path wall, the flow amplifiers each being supported on a cover plate and located within the aft chamber.

The flow amplifiers may each include an elongated diffuser extending in an upstream direction relative to a gas flow through the flow path and directing the energized flow between the struts toward a forward chamber of the outer cavity defined adjacent to a seal between a turbine section of the engine and the turbine exhaust casing.

The diffuser may have an outlet end defining an elliptical shape for discharging the energized flow in a sheet-like pattern, elongated in the circumferential direction.

The diffusers may have an outlet end located adjacent to a radially constricted passage between the forward and aft chambers of the outer cavity.

A bearing cavity may be located radially inward of the inner flow path wall for conducting cooling air, and a barrier structure may extend between the struts and the strut shields for limiting flow of cooling air radially outward from the bearing cavity into the strut shields.

In accordance with a further aspect of the invention, a method of controlling a temperature distribution within an annular cavity of a turbine engine is provided, the method including providing an outer cavity defined between an outer casing and an annular exhaust gas flow path, the outer cavity containing cavity air; providing a plurality of flow energizers circumferentially distributed within the outer cavity, each of the flow energizers having a flow body located within the outer cavity and each of the flow bodies having inlet and outlet ports. A flow of cavity air is induced into each flow energizer through the inlet port and forms an energized flow of the cavity air out of the outlet port to induce a circumferentially circulating flow of the cavity air around the outer cavity.

An energizing air flow may be supplied to each of the flow bodies, wherein the energized flow exits the flow energizers at a greater volume flow rate than a volume flow rate of the energizing air flow into the energizers.

The energizing air flow may pass through the outer wall prior to entering the flow bodies.

The circumferentially circulating flow of the cavity air may equalize the temperature, in the circumferential direction, of the outer cavity.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
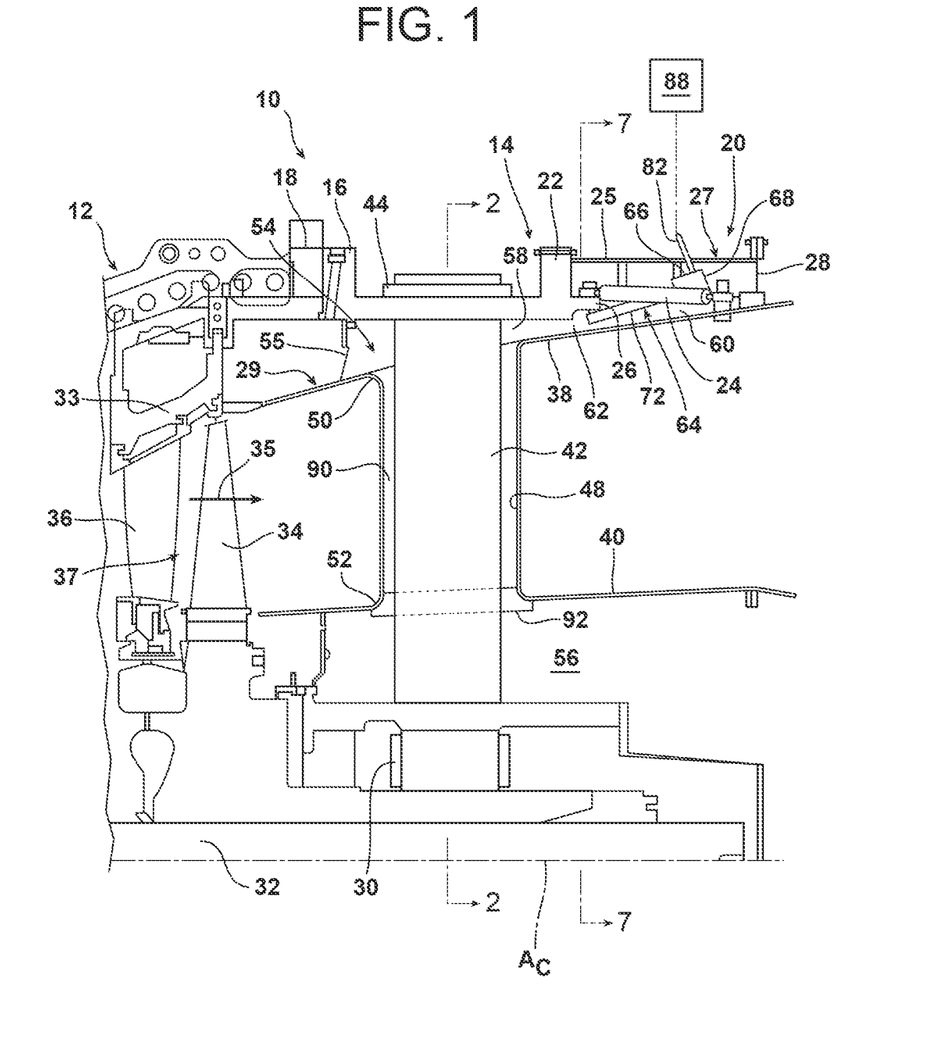
FIG. 1 is a cross-sectional view through a gas turbine engine, including a portion of a turbine section and an exhaust section, illustrating aspects of the present invention.
Figure 7:
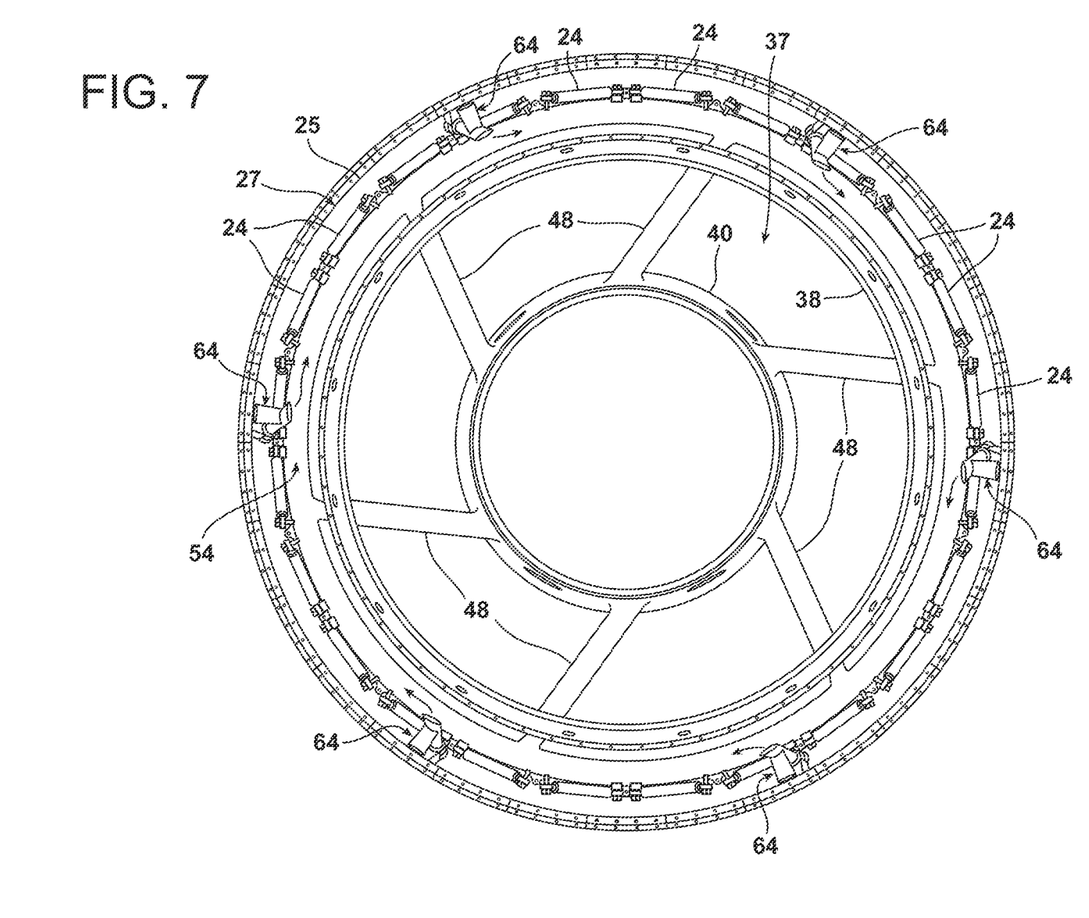
FIG. 7 is a cross-sectional view taken along line 7-7 in FIG. 1.

Referring to FIG. 1, a portion of an exhaust section 10 of a gas turbine engine is shown, located axially downstream from a turbine section 12, to illustrate aspects of the present invention. The exhaust section 10 generally comprises a cylindrical structure comprising an outer portion defined by an outer casing 14 extending circumferentially around a generally horizontal central longitudinal axis $A_C$. The outer casing 14 of the exhaust section 10 comprises a turbine exhaust casing including a forward flange 16 joined to a flange 18 of the turbine 12. The outer casing 14 additionally includes an aft support structure 20 extending rearwardly from a radially extending rear flange 22. The aft support structure 20 comprises a plurality of support rods 24 (one shown in FIG. 1) supported to a horizontal flange 26 and extending rearwardly to an aft wall 28, see also FIG. 3, and provided for supporting at least a portion of an exhaust diffuser 29. In the illustrated embodiment, twenty-four support rods 24 are provided, as may be seen in FIG. 7 In addition, a plurality of aft exhaust casing covers 25 are supported between the rear flange 22 and the aft wall 28 to form an outer aft casing 27 circumferentially surrounding the support rods 24. The aft covers 25 are preferably attached by fasteners, such as bolts, to the rear flange 22 and aft wall 28 at forward and rearward cover flanges 25a, 25b (FIG. 3), permitting the aft covers 25 to be removably installed.

Figure 2:
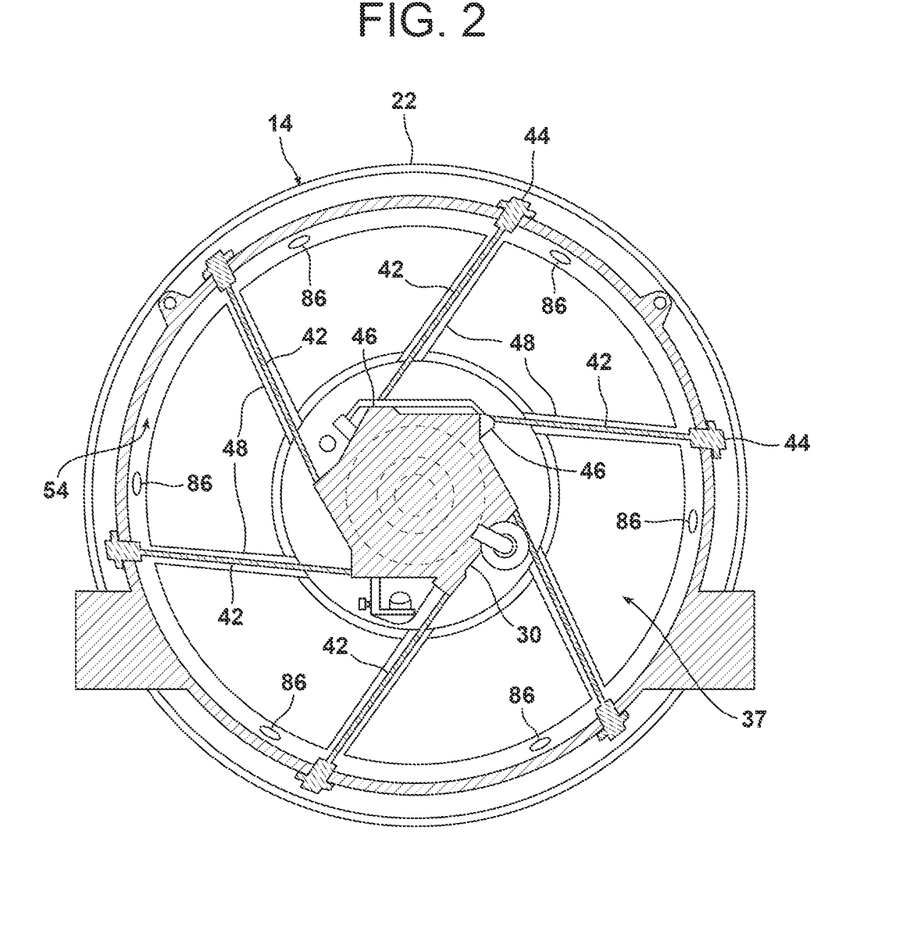
FIG. 2 is a cross-sectional view taken along line 2-2 in FIG. 1.

The outer casing 14 comprises a relatively thick wall forming a structural member or frame for supporting a rear end bearing 30 of the engine, see also FIG. 2. It may be understood that the engine includes a rotor 32 supporting a plurality of blades 34 for rotation within the turbine section 24. In particular, a hot working gas 35 is produced in a combustor section (not shown) of the engine and flows through a flow path 37 extending through the turbine section 12 where it is expanded through stages of the turbine section 12 formed by rows of vanes 36 and rows of the blades 34 to cause the blades 34 and rotor 32 to rotate for producing a work output from the engine.

The diffuser 29 comprises an outer flow path wall 38 and an inner flow path wall 40 defining an annular passage, comprising a continuation of the flow path 37, for conveying the expanded hot working gas, or exhaust gases, from the turbine section 12. The end bearing 30 is supported by a plurality of struts 42 extending from a connection 44 on the outer casing 14, through the diffuser 29, to a connection 46 on the bearing 30 for supporting and maintaining the bearing 30 at a centered location within the outer casing 14. In addition, a portion of each of the struts 42 extending through the flow path 37 within the diffuser 29 is surrounded by a strut shield 48 for isolating the strut 42 from the hot exhaust gases 35 passing through the diffuser 29. It may be understood that the strut shields 48 comprise hollow structures having outer and inner ends 50, 52 connected to the outer and inner flow path walls 38, 40 of the diffuser 29.

As a result of the exhaust gases passing through the diffuser 29, the outer and inner flow path walls 38, 40 become hot and radiate heat radially outward and radially inward. In particular, heat is radiated outward and heats air within an intermediate area, referred to herein as an annular outer cavity 54, between the outer casing 14 and an inner portion defined by the outer wall 38 of the diffuser 29, and bounded in the axial direction by an axially forward finger seal 55 at the interface between the turbine flange 18 and the outer casing 14 and by the aft wall 28. Similarly, heat is radiated from the inner wall 40 to a bearing cavity 56, where cooling air may be provided by a flow of bearing cavity air for ensuring that the bearing 30, and any associated lubricating fluid, is not overheated. However, the inner wall 40 may include insulation (not shown) within the bearing cavity 56 to limit or reduce the amount of heat transferred from the inner wall 40.

In accordance with an aspect of the invention, it has been recognized that control of temperatures, and in particular a balanced distribution of the temperature gradient within the annular outer cavity 54 is difficult due to several factors. These factors include limited access to provide cooling air or an airflow to the intermediate space forming the outer cavity 54; the axial length of the radially outer portion of the struts 42 extending through the outer cavity forming barriers that divide the space into thermally separate sections, in the circumferential direction, limiting the ability to provide a controlled circumferential flow of air through a forward chamber 58 of the outer cavity 54; and the support rods 24 operating to effectively block the flow of air in the circumferential direction within an aft chamber 60 of the outer cavity 54. It may be noted that the forward and aft chambers 58, 60 of the outer cavity 54 are connected by a radially restricted passage 62 axially located near the rear flange 22, and that the restricted passage 62 tends to narrow as the diffuser 29 is heated and the outer wall 38 expands outward toward the outer casing 14.

Due to natural convection the warmed or hot air within the outer cavity 54 tends to rise to the upper half of the engine, creating an uneven temperature distribution in which the struts 42 and a portion of the outer casing 14 in the upper half of the engine may become substantially hotter than the struts 42 and a portion of the outer casing 14 in the lower half of the engine. For example, a temperature difference of about 180° C. may exist between the upper and lower halves of the engine within the exhaust section 10. Consequently, the outer casing may exhibit a distortion from its cylindrical shape, or ovalization, in which the vertical dimension of the outer casing is greater than its horizontal dimension. Additionally, the differential thermal movement, i.e., differential expansion and contraction, of the struts 42 may cause the position of the end bearing 30 to shift from its centered position, such as is exhibited by a downward shift of the bearing 30 within the engine, moving the blades 34 closer to the surrounding blade ring structure 33 (FIG. 1) and resulting in a reduced blade tip clearance and possibly rubbing. In addition, it is believed that cyclical variations in the shape of the outer casing 14, such as occurs with normal cyclical operation and shut down of the engine, may increase thermally induced stresses, with an accompanying reduction in component life, in the structure of the exhaust section 10.

In accordance with an aspect of the invention, an air circulation system is provided to induce or generate a flow of air within the outer cavity 54 to substantially reduce the temperature differential around the circumference of the exhaust section, and thereby reduce the effects of temperature on the outer casing 14 and on the position of the end bearing 30.

Referring to FIGS. 1, 3, 4 and 7, the air circulation system includes a plurality of flow energizers 64 located in circumferentially spaced relation to each other within the outer cavity 54 to provide a flow of a medium, i.e., a first medium, comprising warmed or heated cavity air within the outer cavity 54. As noted above, during operation of the engine, producing exhaust gases, the outer flow path wall 38 radiates heat outward to the outer cavity 54 creating very high temperature air in the outer cavity 54. As described further below, the energizers 64 are provided to create a movement or current of the heated air within the outer cavity 54. Further, it may be understood that the ejected flow of medium from each of the energizers 64 has a temperature substantially similar to the temperature of the air in the vicinity of the particular energizer 64, wherein a distribution of the hot air within the outer cavity 54 is provided so as to avoid or limit thermal stresses that could occur from, for example, localized cooling methods, e.g., cooling methods utilizing injection of cooling air.

Figure 8:
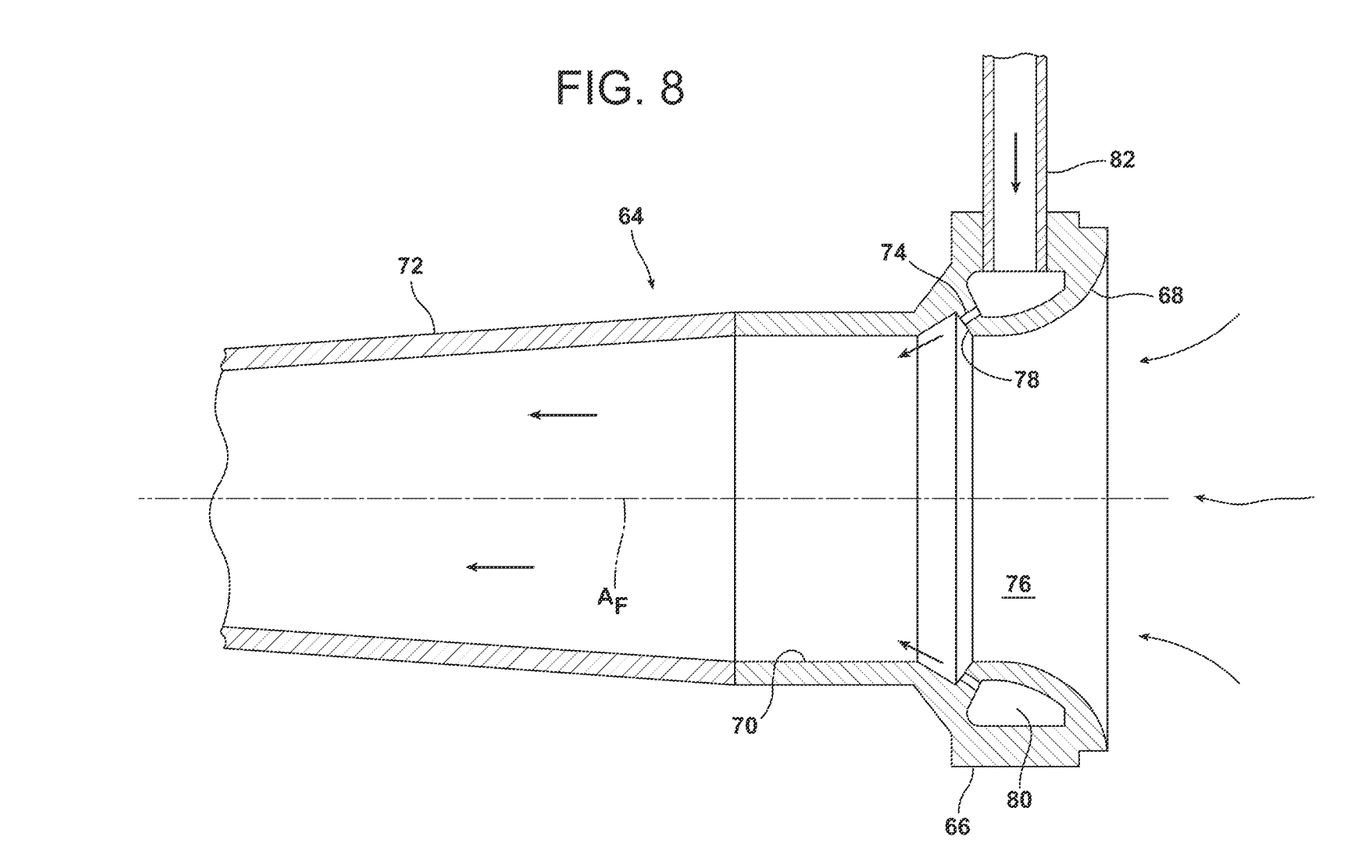
FIG. 8 is a cross-sectional view illustrating a flow energizer comprising a flow amplifier.

Referring additionally to FIG. 8, the flow energizers 64 each comprise a flow body 66, which may be a cylindrical body, defining a central flow axis $A_F$ for flow of the first medium from an inlet port 68 of the flow body 66 to an outlet port 70 of the flow body 66. In the illustrated embodiment, a diffuser 72 is affixed to the flow body 66 and extends axially from the outlet port 70 for directionally conducting an energizer flow from the outlet port 70. Although the diffuser 72 is described as a separate component from the energizer body 66, it may be understood that the diffuser 72 may be formed integrally with the energizer body 66.

A supply port 74 is located within the energizer body 66 between the inlet and outlet ports 68, 70 for injection of a second medium into a flow path 76 defined through the flow body 66 parallel to the central flow axis $A_F$. The supply port 74 may be a generally continuous annular port formed through an interior surface 78 of the flow body 66, or may comprise a plurality of circumferentially spaced apertures, located in fluid communication with an annular supply chamber 80 in the annular body 66. The supply port 74 is formed as a passage from the supply chamber 80 having a component in the axial downstream direction of the central flow axis $A_F$ for discharging the second medium downstream toward the exit port 70.

The supply chamber 80 is supplied with the second medium, which preferably comprises compressed air, through a second medium conduit 82. The second medium, hereinafter referred to as "compressed air", is discharged from the supply port 74 at a high flow velocity to induce a flow of the first medium to flow into the inlet port 68 and through the flow passage 76 to the outlet port 70. It may be understood that the flow body may comprise a commercially available flow amplifier wherein a volume flow rate of the medium entering the inlet port 68 is much greater than a volume flow rate of the compressed air provided through the supply port 74, and the exiting energizer flow is a mixture flow, or mixed medium, comprising a mixture of the compressed air and the medium drawn in through the inlet port 68. Hence, the flow body 66 operates in accordance with conventional flow amplifier principles.

Figure 3:
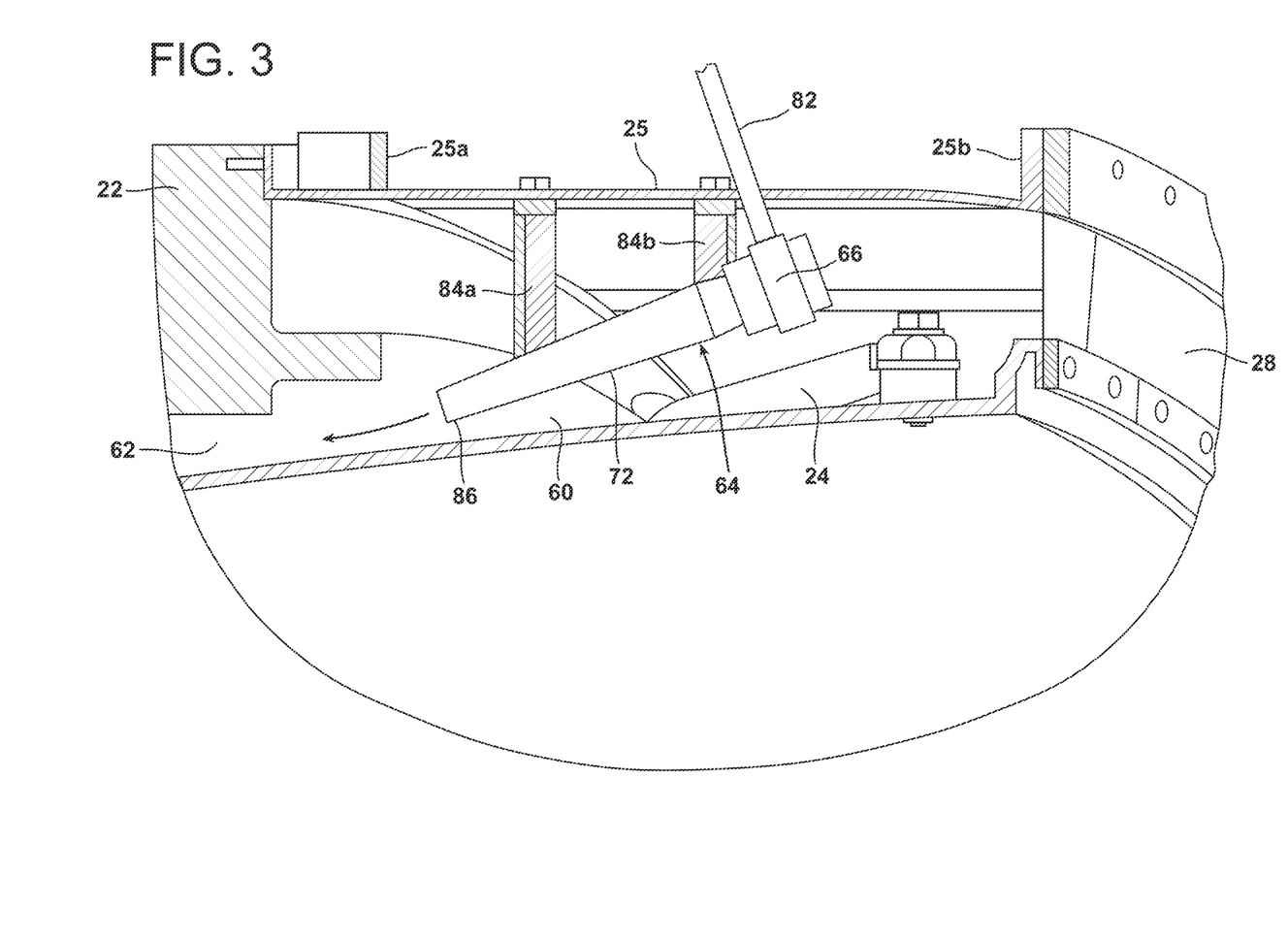
FIG. 3 is an enlarged perspective view illustrating a flow energizer located in an outer cavity of the exhaust section.

As seen in FIGS. 1 and 3, each of the flow energizers 64 are located in the aft chamber 60 of the outer cavity 54, and are supported on a respective aft cover 25 with the diffuser 72 extending from the flow body 66 in an axially upstream direction, i.e., upstream relative to the flow of exhaust gases through the diffuser 29. In particular, the energizers 64 may be bolted, via brackets 84a, 84b (FIG. 4), to the underside of respective aft covers 25 with the second medium conduit 82 extending radially outward from the outer cavity 54 through the aft cover 25. The energizer 64 is supported with the diffuser 72 angled radially inward toward the restricted passage 62 to direct the ejection flow from the energizer 64 axially forward through the restricted passage 62 and into the forward chamber 58

Figures 4, 5:
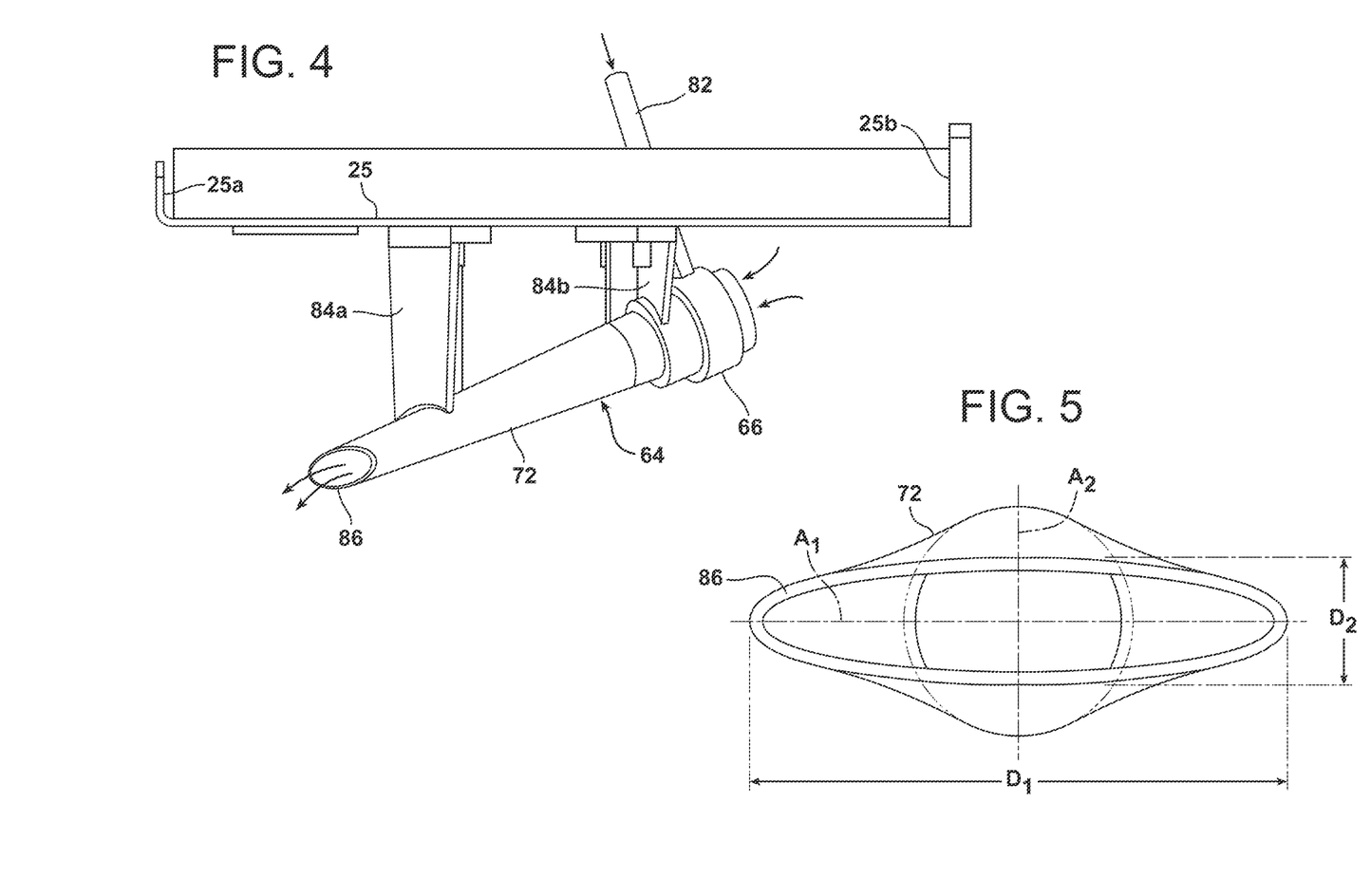
FIG. 4 is a perspective view of the flow energizer of FIG. 3, and viewed from a different angle.
FIG. 5 is an end view of a diffuser of the flow energizer.

Referring to FIGS. 4 and 5, an outlet end 86 of the diffuser 72 defines an elliptical or generally elliptical shape having a major axis $A_1$ extending in the circumferential direction, and a minor axis $A_2$ extending in the radial direction. In the illustrated embodiment, the dimension $D_1$ of the major axis $A_1$ is about four times greater the than the dimension $D_2$ of the minor axis $A_2$. The outlet end 86 of the diffuser 72 is configured to form a circumferentially elongated sheet of ejection flow that passes through the restricted passage 62 and between the struts 42, moving the warmed air from between the struts 42 axially forward toward the finger seal 55 at the axially upstream side of the forward chamber 58.

Figure 6:
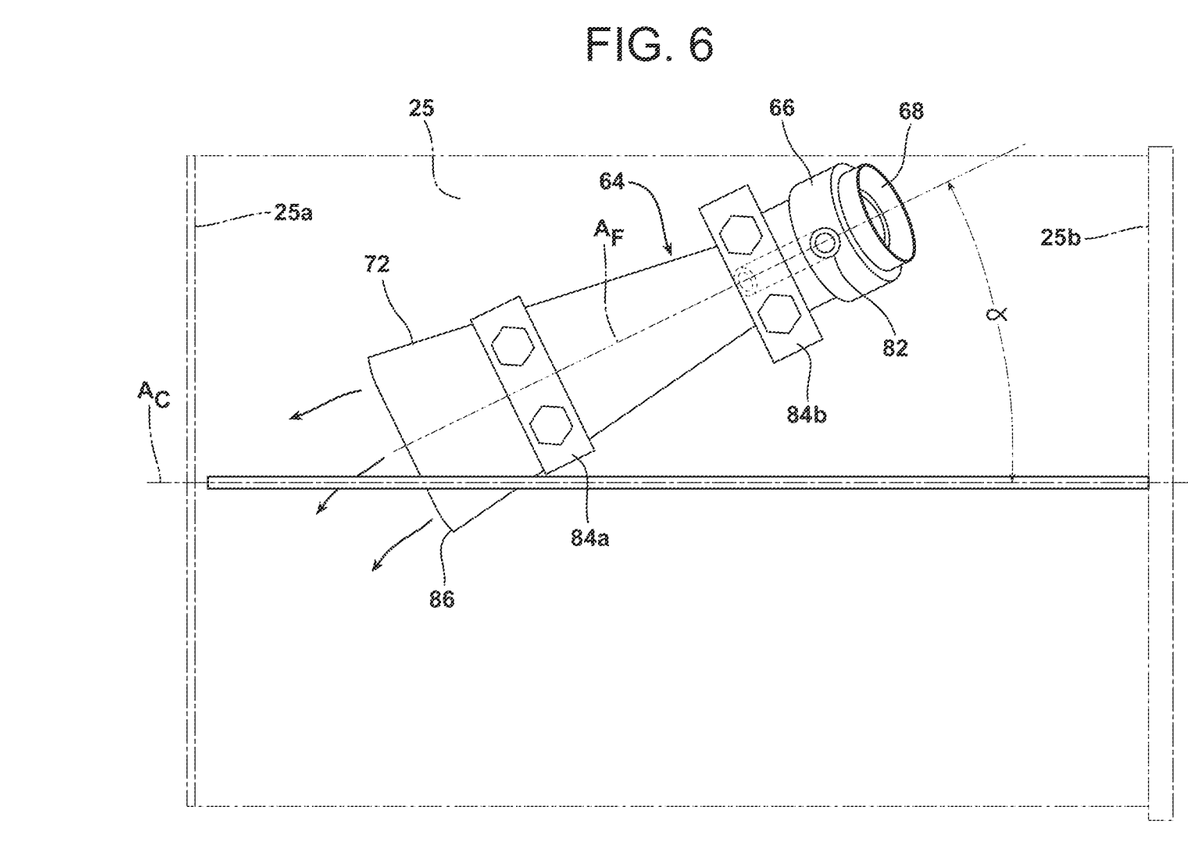
FIG. 6 is a plan view of a flow energizer mounted in relation to an aft exhaust casing cover.

Additionally, as may be seen in FIG. 6, each of the energizers 64 are supported with the central flow axis $A_F$ of the flow body 66 oriented at an angle, α, relative to the central longitudinal axis $A_C$ of the engine. In the illustrated embodiment the flow axis $A_F$ is oriented at an angle, α, of about 26° relative to the longitudinal axis $A_C$ and directs the energizer flow with a component in the clockwise circumferential direction, when viewed in the downstream direction of the exhaust flow. The air exiting the energizers 64 travels axially forward to the finger seal 55, and is deflected to travel substantially circumferentially around the outer cavity 54. Hence, the circumferentially angled direction of the energizer flow induces a circumferentially circulating flow of the hot air within the outer cavity 54 such that the warmer air that normally tends to accumulate at upper portions of the outer cavity 54, i.e., by natural convection, is directed downward toward the lower half of the engine, and the cooler air that normally tends to accumulate at the lower portions of the outer cavity 54 is directed upward toward the upper half of the engine. It may be understood the circumferentially circulating flow of air within the outer cavity 54 operates to substantially equalize the temperature around the circumference of the exhaust section 10 at the outer cavity 54. Further, it may be understood that the axial displacement of the cavity air within the outer cavity 54 from the aft chamber 60 to the forward chamber 58, in combination with the circumferential movement of the air around the outer cavity 54, operates to provide both an axial and a circumferential movement of air for equalizing the temperature within the outer cavity 54.

As noted above, the strut shields 48 comprise hollow structures, and passages 90 (FIG. 1) may be defined between the strut shields 48 and the associated struts 42. In order to limit the cooling air in the bearing cavity 56 from passing in the radial outward direction to the outer cavity 54, flow barriers 92 may be provided at the locations where the struts 42 extend radially inward from the inner flow path wall 40. The barriers 92 extend between the struts 42 and the inner flow path wall 40 and substantially prevent or limit flow of the bearing cooling air through the passages 90. Hence, the barriers 92 and substantially prevent additional thermal gradient conditions that could be formed by uncontrolled passage of the bearing cooling air into the outer cavity 54 at the locations of the struts 42.

In operation, it may be understood that the majority of the air supplied from the energizers 64 comprises the hot cavity air extracted from the aft chamber 60 into the inlet ports 68 of the flow bodies 66, and only a small portion of the energizer air comprises the compressor air provided through the second medium conduits 82.

Further, it may be noted that the compressed air provided to the conduits 82 may be sourced from a shop air source typically found in the vicinity of power plant turbine engines, as depicted herein by 88 (FIG. 1), for supplying maintenance air during maintenance operations when the engine is out of service. It may be understood that associated with the shop air source 88, appropriate valving, flow regulators and other flow control components may be provided to control the flow rate and/or pressure of the air provided to the energizers 64, and that the compressed air flow may be individually controlled, i.e., at different flow rates and/or pressures, for each of the energizers 64. Alternatively, other sources of compressed air may be used including a portion of the bleed air from a compressor section of the engine.

Further, the circulation of air within the outer cavity 54, as provided by the flow energizers 64, is preferably implemented prior to start-up of the engine to control or limit formation of temperature gradients, and to preferably avoid formation of temperature differentials between the upper and lower portions of the turbine exhaust section 10. The air circulation system is then operated during engine operation. The air circulation system is also preferably run following engine shut-down until the component temperatures within the engine fall below a critical temperature where the likelihood of interference between moving components and stationary components, such as rubbing of the turbine blades on the surrounding blade ring structure, is substantially reduced.

It may be understood from the above description, that mounting the energizers 64 to the aft covers 25 is conducive to assembly of the energizer and cover structure as an in-shop operation, apart from the engine. Further, since the aft covers 25 are a removably mounted component of the engine, i.e., as a bolted on component, an existing aft cover 25 may be readily replaced by an assembly comprising an energizer 64 mounted to an aft cover 25, forming an energizer and cover structure. Hence, a plurality of the energizer and cover structures may be prepared in-shop and shipped to locations of existing engines to provide an in-field modification of the existing engines to implement the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine engine including:
   an intermediate space defined between outer and inner portions of the turbine engine; and
   a flow energizer including a flow body located within said intermediate space and including an inlet port, an outlet port and a flow passage extending within said flow body between said inlet and outlet ports, said inlet port receiving a flow of a first medium located within said intermediate space and said flow body injecting an energizing flow of a second medium to a portion of said first medium within said flow body to create an energized flow of mixed medium from said outlet portion, said energized flow of mixed medium creating a flow of said first medium adjacent to said flow body within said intermediate space,
   wherein the flow body includes a supply port for receiving the second medium from a source external to the outer cavity the second medium being injected into the flow passage of the flow body, between the inlet and outlet ports, to energize the flow of the first medium through the flow body.

2. The turbine engine of claim 1, wherein said intermediate space comprises an annular outer cavity generally centered around a longitudinal axis of said engine between said outer and inner portions.

3. The turbine engine of claim 2, wherein said outer portion comprises an exhaust casing and said engine includes a plurality of struts extending radially through said outer cavity from said exhaust casing to a rear bearing for said engine, a plurality of said flow energizers are provided for ejecting a plurality of energized flows in an axial direction between said struts.

4. The turbine engine of claim 3, including an annular exhaust gas flow path extending through said exhaust casing, said flow path defined between an inner flow path wall and an outer flow path wall, said outer flow path wall comprising said inner portion, and said struts extend through strut shields extending between said inner and outer flow path walls wherein said strut shields form a flow path between said outer cavity and a bearing cavity radially inward from said inner flow path wall.

5. The turbine engine of claim 4, including a barrier structure between said struts and respective ones of said strut shields, adjacent to said inner flow path wall, limiting passage of air from within said bearing cavity radially outward to said outer cavity.

6. The turbine engine of claim 3, wherein said flow energizers include an elongated diffuser extending in an upstream direction relative to a gas flow through said flow path, and said diffusers are oriented to provide a direction of said plurality of energized flows having a component in the circumferential direction to induce a circumferential flow of said first medium around said outer cavity.

7. The turbine engine of claim 1, wherein said flow energizer is a flow amplifier and said energizing flow of said second medium comprises a flow of compressed air provided to said flow passage, wherein a volume flow of said mixed medium from said flow passage is substantially greater than a volume flow of said compressed air into said flow passage.

8. A gas turbine engine including an outer casing, an annular exhaust gas flow path defined between outer and inner flow path walls, and an outer cavity located radially outward from said flow path, and further comprising:
   a plurality of structural struts supporting a rear bearing of said engine to said outer casing;
   a strut shield surrounding each of said struts in an area extending between said outer and inner flow path walls;
   a plurality of flow amplifiers circumferentially distributed within said outer cavity for effecting a circulating flow in a circumferential direction, each of said flow amplifiers having a flow body located within said outer cavity and defining an inlet port for receiving a first medium within a flow passage of said flow body, and an outlet port for providing an energized flow ejecting said first medium entering said inlet port.

9. The gas turbine engine of claim 8, wherein each said flow body includes a supply port for receiving a second medium from a source external to said outer cavity, said second medium being injected into said flow passage of said flow body, between said inlet and outlet ports, to energize a flow of said first medium through said flow body.

10. The gas turbine engine of claim 9, wherein said supply port is connected to a conduit extending through said outer wall to said flow body for supplying said second medium.

11. The gas turbine engine of claim 8, wherein said outer casing comprises a turbine exhaust casing and an aft support structure supported at a rear flange of said turbine exhaust casing, said aft support structure including a plurality of detachable cover plates located circumferentially around said aft support structure to define an aft chamber of said outer cavity between said cover plates and said outer flow path wall, said flow amplifiers each being supported on a cover plate and located within said aft chamber.

12. The gas turbine engine of claim 11, wherein said flow amplifiers each include an elongated diffuser extending in an upstream direction relative to a gas flow through said flow path and directing said energized flow between said struts toward a forward chamber of said outer cavity defined adjacent to a seal between a turbine section of said engine and said turbine exhaust casing.

13. The gas turbine engine of claim 12, wherein said diffuser has an outlet end defining an elliptical shape for discharging said energized flow in a sheet-like pattern, elongated in the circumferential direction.

14. The gas turbine engine of claim 12, wherein said diffusers have an outlet end located adjacent to a radially constricted passage between said forward and aft chambers of said outer cavity.

15. The gas turbine engine of claim 8, including a bearing cavity located radially inward of said inner flow path wall for conducting cooling air, and a barrier structure extending between said struts and said strut shields for limiting flow of cooling air radially outward from said bearing cavity into said strut shields.

16. A method of controlling a temperature distribution within an annular cavity of a turbine engine, said method including:
   providing an outer cavity defined between an outer casing and an annular exhaust gas flow path, said outer cavity containing cavity air;
   providing a plurality of flow energizers circumferentially distributed within said outer cavity, each of said flow energizers having a flow body located within said outer cavity and each said flow body having inlet and outlet ports; and
   inducing a flow of cavity air into each flow energizer through said inlet port and forming an energized flow of said cavity air out of said outlet port to induce a circumferentially circulating flow of said cavity air around said outer cavity.

17. The method of claim 16, including supplying an energizing air flow to each of said flow bodies, wherein said energized flow exits said flow energizers at a greater volume flow rate than a volume flow rate of said energizing air flow into said energizers.

18. The method of claim 17, wherein said energizing air flow passes through said outer wall prior to entering said flow bodies.

19. The method of claim 16, wherein said circumferentially circulating flow of said cavity air equalizes the temperature, in the circumferential direction, of said outer cavity.

* * * * *